United States Patent
Fukuda et al.

(10) Patent No.: US 11,193,857 B2
(45) Date of Patent: Dec. 7, 2021

(54) TIRE TESTER MACHINE HAVING A LUBRICATOR IN A CONVEYING DIRECTION

(71) Applicant: KOBE STEEL, LTD., Hyogo (JP)

(72) Inventors: Jumpei Fukuda, Takasago (JP); Yoshiaki Matsubara, Takasago (JP); Yu Sumimoto, Takasago (JP); Takashi Sumitani, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 218 days.

(21) Appl. No.: 16/623,294

(22) PCT Filed: Jun. 28, 2018

(86) PCT No.: PCT/JP2018/024498
§ 371 (c)(1),
(2) Date: Dec. 16, 2019

(87) PCT Pub. No.: WO2019/009168
PCT Pub. Date: Jan. 10, 2019

(65) Prior Publication Data
US 2020/0217755 A1 Jul. 9, 2020

(30) Foreign Application Priority Data

Jul. 3, 2017 (JP) .............................. JP2017-130449

(51) Int. Cl.
*G01M 17/02* (2006.01)
*B60C 25/00* (2006.01)
(Continued)

(52) U.S. Cl.
CPC ............ *G01M 17/022* (2013.01); *B05C 1/00* (2013.01); *B05C 13/02* (2013.01); *B60C 25/007* (2013.01);
(Continued)

(58) Field of Classification Search
None
See application file for complete search history.

(56) References Cited

U.S. PATENT DOCUMENTS 6,082,191 A    7/2000  Neiferd et al.
8,950,250 B2   2/2015  Wakazono et al.
(Continued)

FOREIGN PATENT DOCUMENTS

JP    S62242525 A   10/1987
JP    5416427 B2    2/2014

OTHER PUBLICATIONS

The extended European search report issued by the European Patent Office dated Feb. 2, 2021, which corresponds to European Patent Application No. 18828543.1-1001 and is related to U.S. Appl. No. 16/623,294.
(Continued)

*Primary Examiner* — Andre J Allen
*Assistant Examiner* — Jermaine L Jenkins
(74) *Attorney, Agent, or Firm* — Studebaker & Brackett PC

(57) ABSTRACT

A tire testing machine is for testing a tire, comprising a free roller section configured to include a plurality of rollers having an endmost roller disposed downstream of a lubricator in a conveying direction and farthest from a predetermined reference position, the endmost roller being disposed such that a horizontal distance from the reference position is equal to or greater than a radius of a largest of a plurality of tires set in advance as objects of application of a lubricant.

7 Claims, 20 Drawing Sheets

(51) Int. Cl.
B60C 25/05 (2006.01)
B29D 30/00 (2006.01)
B05C 1/00 (2006.01)
B05C 13/02 (2006.01)

(52) U.S. Cl.
CPC .. B60C 25/0596 (2013.01); *B29D 2030/0066* (2013.01)

(56) References Cited

U.S. PATENT DOCUMENTS

| | | | |
|---|---|---|---|
| 9,429,498 B2* | 8/2016 | Vernyi | G01M 17/021 |
| 2001/0013396 A1 | 8/2001 | Ronge et al. | |
| 2013/0233066 A1* | 9/2013 | Wakazono | G01M 17/021 |
| | | | 73/146 |
| 2013/0333615 A1 | 12/2013 | Wakazono et al. | |
| 2014/0251757 A1 | 9/2014 | Wakazono et al. | |
| 2014/0332348 A1 | 11/2014 | Wakazono et al. | |
| 2014/0353088 A1 | 12/2014 | Wakazono | |
| 2015/0007644 A1* | 1/2015 | Wakazono | G01M 17/02 |
| | | | 73/146 |
| 2016/0084738 A1* | 3/2016 | Okada | G01M 17/022 |
| | | | 73/118.01 |
| 2019/0359017 A1* | 11/2019 | Ueda | B60C 25/0509 |

OTHER PUBLICATIONS

Notification of Transmittal of Translation of the International Preliminary Report on Patentability and Translation of Written Opinion of the International Searching Authority—PCT/JP2018/024498—dated Jan. 16, 2020.

* cited by examiner

TIRE TESTER MACHINE HAVING A LUBRICATOR IN A CONVEYING DIRECTION

TECHNICAL FIELD

The present invention relates to techniques for tire testing machines and, more particularly, to a technique for transferring a tire to apply a lubricant to the tire in a tire testing machine.

BACKGROUND ART

Regarding tires for automobiles or other vehicles, if the composition or shape of a tire is not uniform in the circumferential direction thereof, it may lower the running performance of the tire. Therefore, a tire testing machine such as uniformity machine is used to check each molded tire, produced by a manufacturing line, for uniformity. For example, in the case of a uniformity machine, a tire is placed with its rotational axis extending in a vertical direction. To the bead of a tire, rims (testing rims) disposed at distal ends of spindles are fitted from above and below. The tire is then rotated about the axes of the spindles, thereby being tested for uniformity. The tire that has been tested is detached from the rims and then passed to the subsequent step.

By the way, because it is sometimes difficult to detach the tire from the rims (to peel the tire off the rims), such a tire testing machine usually includes a lubricating unit configured to apply to the tire a lubricant for facilitating the detachment of the tire from the rims before the start of testing.

For example, Patent Literature 1 discloses a tire testing machine including a spindle to which a tire is to be attached, and a conveyor for delivering the tire to a center position of the spindle. The tire testing machine of Patent Literature 1 includes a lubricator (lubricating unit), disposed upstream of the spindle in a conveying direction of the conveyor, for applying a lubricant to the bead of the tire. In addition, at the position where the lubricator is disposed, a photoelectric sensor capable of checking if the tire is at the lubricator is disposed.

The tire testing machine 1 of Patent Literature 1 includes not only the above-mentioned photoelectric sensor disposed at the position of the lubricator, but also photoelectric sensors disposed upstream and downstream of the above-mentioned photoelectric sensor in the conveying direction. Thus, the tire testing machine of Patent Literature 1 includes a total of three photoelectric sensors.

The tire testing machine of Patent Literature 1 performs an operation using the three photoelectric sensors, specifically, the operation of measuring the size of the tire while conveying the tire in the conveying direction. Thereafter, the tire testing machine performs an operation (backward operation) of moving the tire backwards in the direction opposite to the conveying direction according to the measured size of the tire, to thereby bring the center of the tire to the position where the lubricator is disposed.

Subsequently, to apply the lubricant to the tire, the tire testing machine raises a free roller section from below the tire, to thereby allow the free roller section to support the tire. Thereafter, the tire testing machine applies the lubricant to the tire while rotating the tire, with the tire being held by adjusting arms and the lubricator.

Here, in the conventional tire testing machines, the free roller section is designed to conform to tires of standard sizes. Therefore, when the tire to be tested by the tire testing machine is not of a standard size and is a tire (large-diameter tire) having a larger diameter than the standard sized tires, the following problem occurs. In such a case, when the free roller section is raised with the center of the large-diameter tire being at the position where the lubricator is disposed, the large-diameter tire is not stably supported by the free roller section.

CITATION LIST

Patent Literature

Patent Literature 1: Japanese Patent No. 6027464

SUMMARY OF INVENTION

The present invention has been made in view of the above-mentioned problem, and it is an object of the present invention to provide a tire testing machine including a free roller section, capable of allowing the free roller section to stably support any selected one of a plurality of tires set in advance as objects of application of a lubricant, when the free roller section is located relatively above a conveyor belt.

Provided is a tire testing machine for testing a tire. The tire testing machine comprises: a conveyor belt, a lubricator, an adjusting arm, and a free roller section. The conveyor belt extends in a horizontal direction and is configured to convey the tire in a conveying direction. The lubricator is disposed at a position corresponding to an intermediate part of the conveyor belt in the conveying direction and is configured to apply a lubricant to an inner circumferential surface of the tire. The adjusting arm is configured to adjust a position of the tire in the horizontal direction relative to the lubricator. The free roller section includes a plurality of rollers arranged along the conveyor belt. The free roller section supports the tire so that the tire is movable in the horizontal direction. The free roller section is configured to be movable in a vertical direction relative to the conveyor belt, between a lower position below the conveyor belt and an upper position above the conveyor belt.

The free roller section is configured such that the plurality of rollers include an endmost roller disposed downstream of the lubricator in the conveying direction and farthest from a predetermined reference position, the endmost roller being disposed such that a horizontal distance between the endmost roller and the reference position is equal to or greater than a radius of a largest one of a plurality of tires set in advance as objects of application of the lubricant. The reference position is a position serving as a reference for a position of a center of the tire when the free roller section moves from the lower position to the upper position relative to the conveyor belt, the reference position being within an area of the lubricator in plan view.

DESCRIPTION OF EMBODIMENTS

Hereinafter, a tire testing machine according to an embodiment of the present invention will be described with reference to the accompanying drawings. It should be understood that the embodiment described below merely serves as a specific example of the invention, and is not intended to limit the invention to the specific example disclosed therein. Hereinafter, the direction in which a tire is conveyed will be referred to as "conveying direction D", and the direction horizontally orthogonal to the tire conveying direction D will be referred to as "width direction W" (or "left and right direction").

Figure 1:
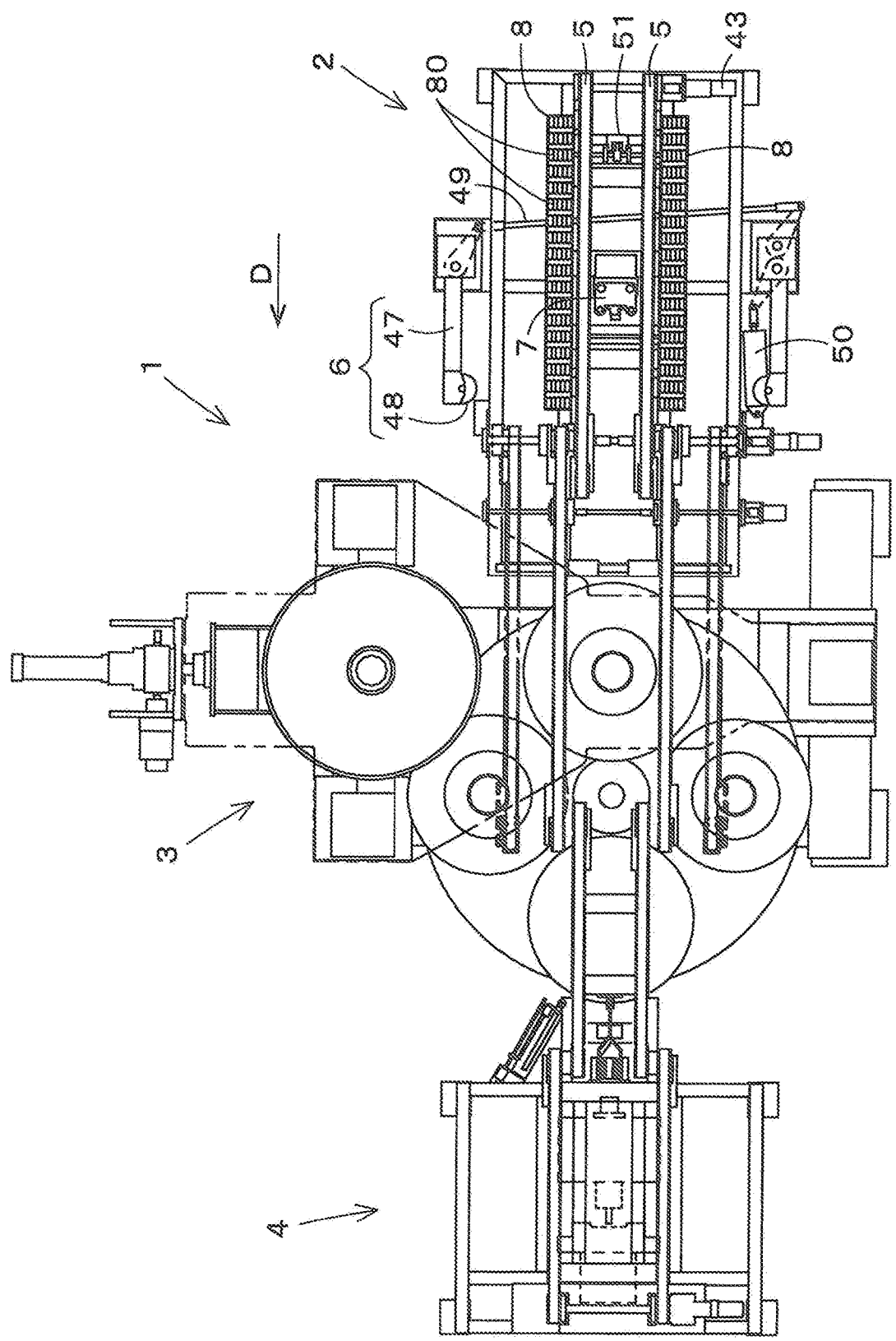
FIG. 1 is a schematic plan view of a tire testing machine according to an embodiment of the present invention.
Figure 2:
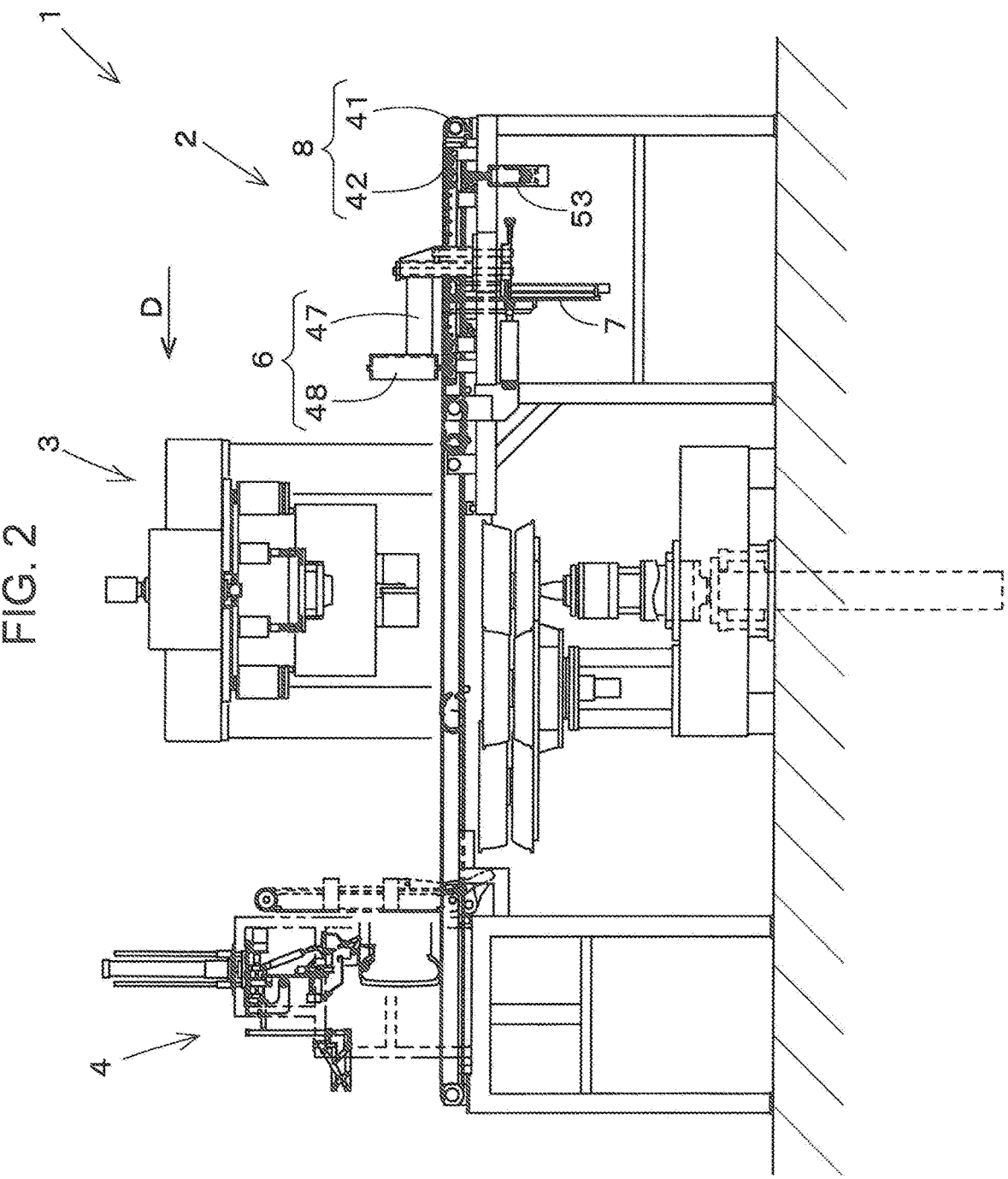
FIG. 2 is a schematic side view of the tire testing machine according to the embodiment.
Figure 3:
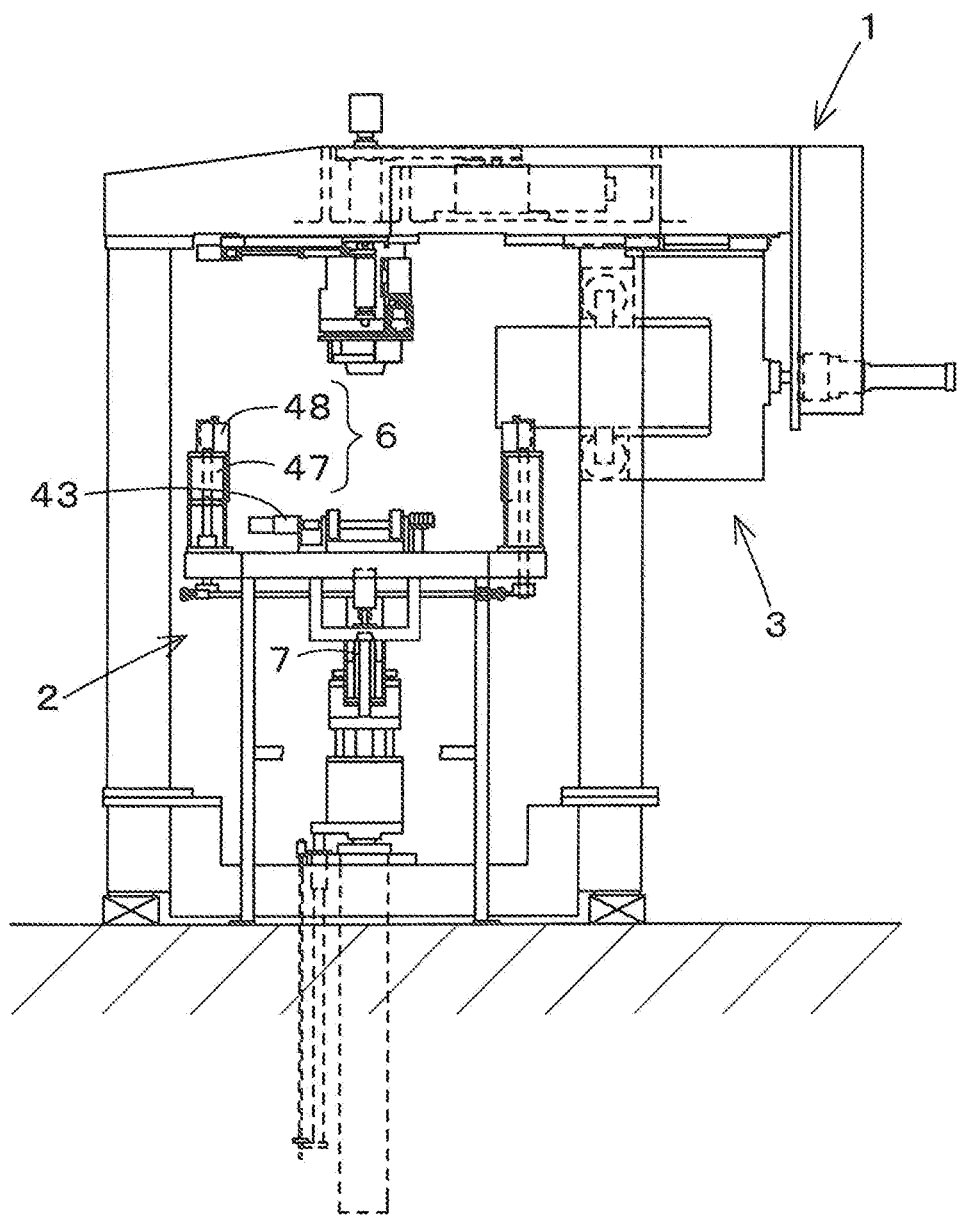
FIG. 3 is a schematic front elevational view of the tire testing machine according to the embodiment.

First, an overall configuration of a tire testing machine 1 will be described with reference to FIGS. 1 to 3. As shown in FIGS. 1 to 3, the tire testing machine 1 according to the present embodiment includes a lubricating unit 2, a tire testing unit 3, and a marking unit 4.

The lubricating unit 2 is configured to apply a lubricant to a bead of a tire while rotating the tire. The tire testing unit 3 is configured to test the tire while, by using a spindle, rotating the tire having been applied with the lubricant in the lubricating unit 2, to thereby detect an abnormality present in the tire. The marking unit 4 is configured to mark a circumferential position of the tire where the abnormality is present. The lubricating unit 2, the tire testing unit 3, and the marking unit 4 are disposed in this order from upstream to downstream along a tire conveyance path (in the conveying direction D).

Figure 4:
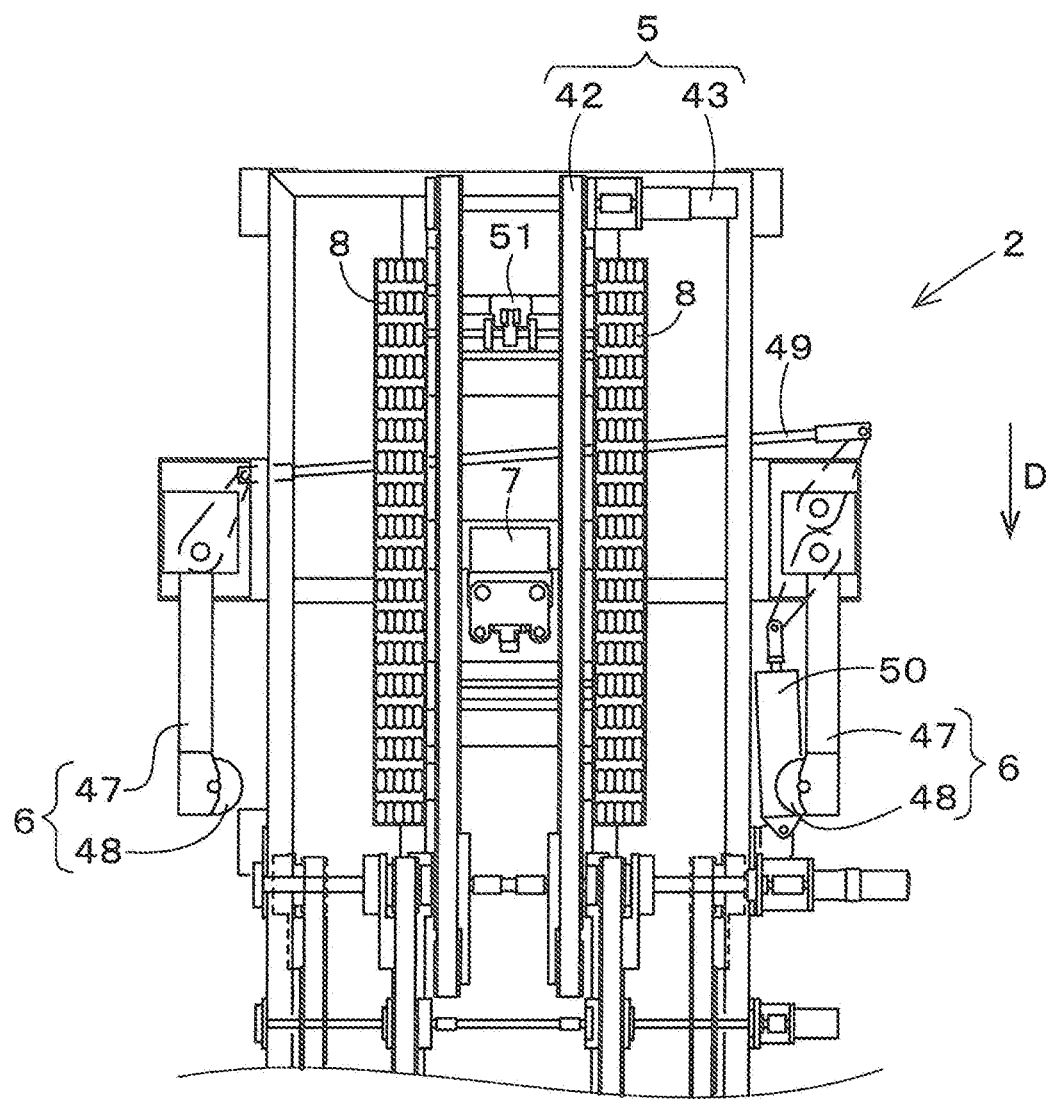
FIG. 4 is an enlarged plan view showing a lubricating unit of the tire testing machine in FIG. 1 (where the upper side of the drawing corresponds to a tire carry-in side).
Figure 5:
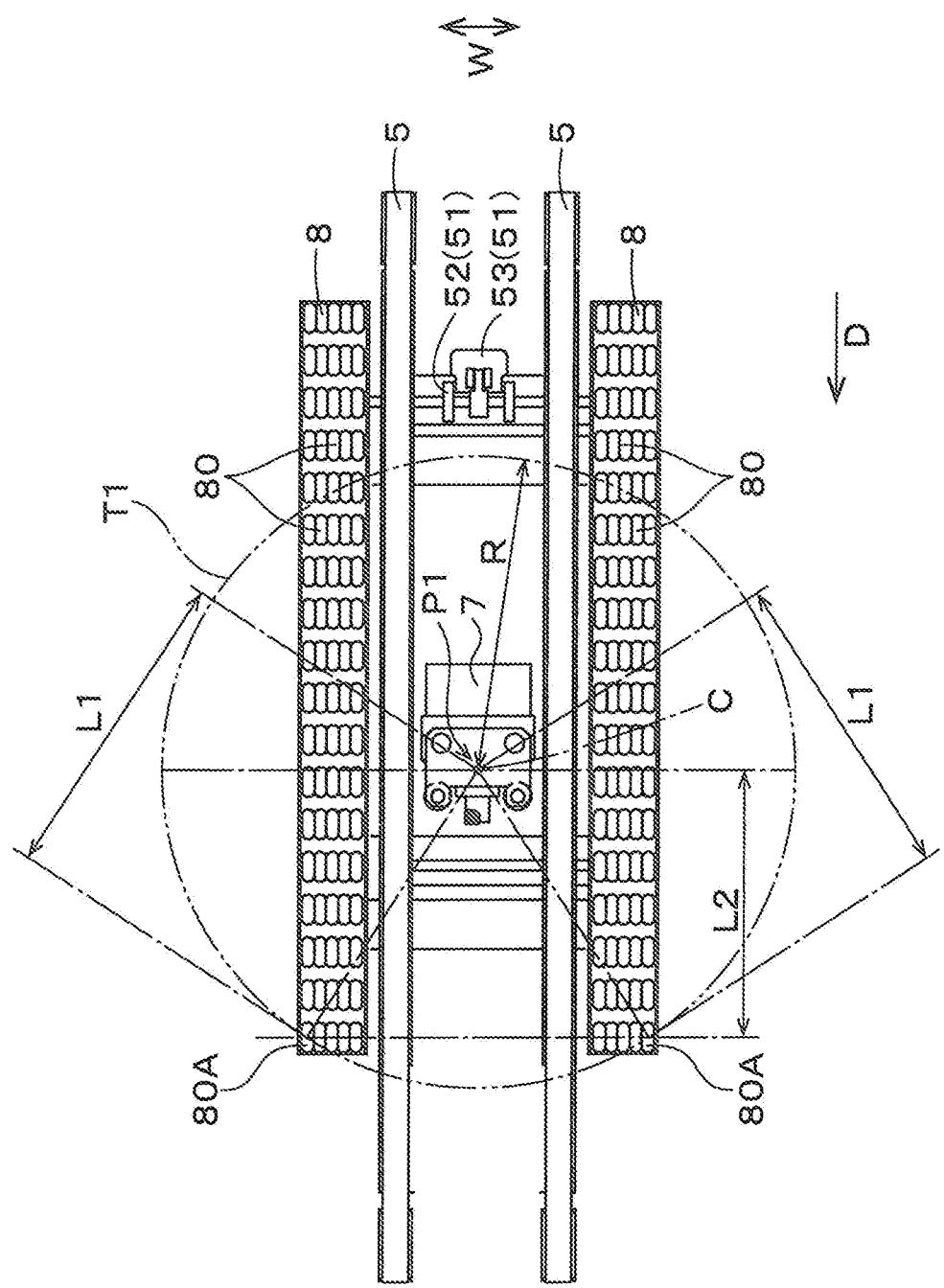
FIG. 5 is an enlarged plan view showing an essential part of the lubricating unit in FIG. 4.
Figure 6:
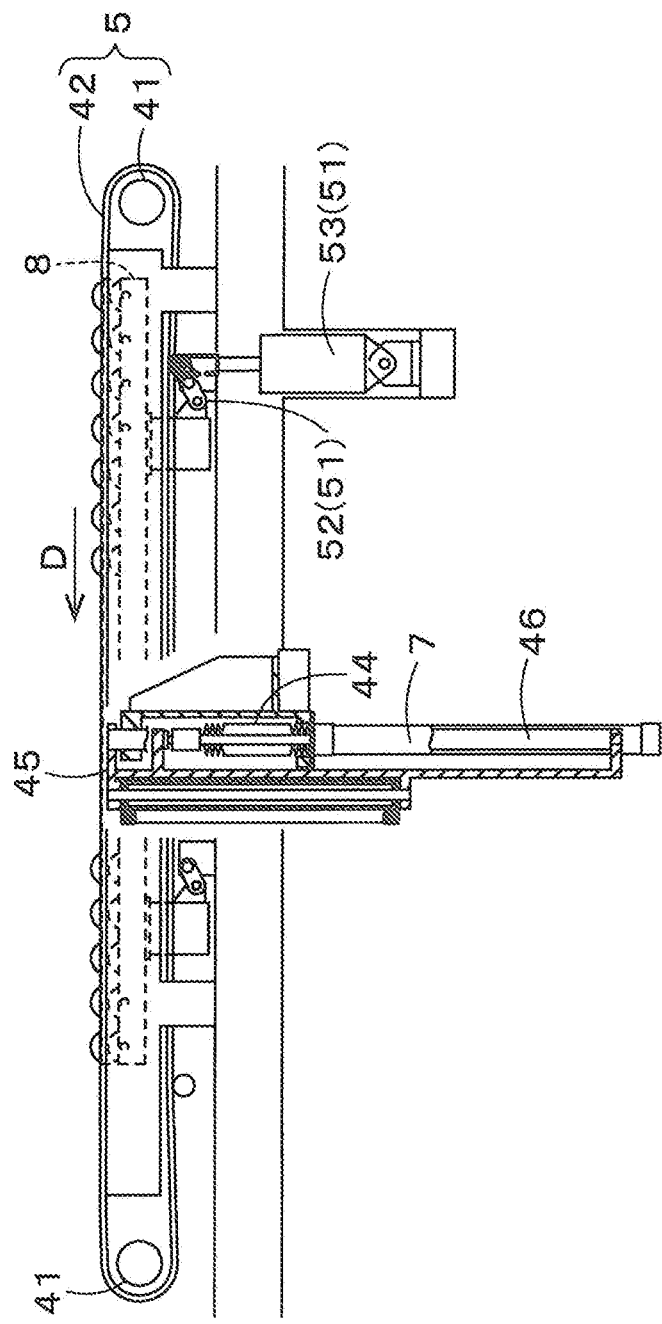
FIG. 6 is an enlarged side view showing an essential part of the lubricating unit of the tire testing machine in FIG. 2, with part of the lubricating unit being drawn as a sectional view.

Now, the lubricating unit 2 will be described in detail with reference to FIGS. 4 to 6. As shown in FIGS. 4 to 6, the lubricating unit 2 includes a pair of conveyor belts 5, a pair of adjusting arms 6, a lubricator 7, and a pair of free roller sections 8.

The paired conveyor belts 5 are spaced from each other in the left and right direction and each extend in the conveying direction D (horizontal direction). The pair of conveyor belts 5 is in the form of long belt conveyors disposed horizontally in the conveying direction D. The pair of conveyor belts 5 is provided over the entire length of the lubricating unit 2. The pair of conveyor belts 5 is configured to convey the tire in the conveying direction D while supporting the tire in a horizontally laid position, i.e. with a rotational axis of the tire extending in a vertical direction.

The lubricator 7 is disposed at a position corresponding to an intermediate part of the conveyor belts 5 in the conveying direction D. The lubricator 7 is disposed between the paired conveyor belts 5. The lubricator 7 is configured to apply the lubricant to the bead defining an inner circumferential surface of the tire.

The pair of adjusting arms 6 is configured to adjust the position of the tire in the horizontal direction relative to the lubricator 7. The paired adjusting arms 6 hold the tire therebetween in cooperation with the lubricator 7, to thereby position the tire.

The pair of free roller sections 8 is configured to support the tire so that the tire is movable in the horizontal direction. Each of the pair of free roller sections 8 includes a plurality of rollers 80 arranged along the pair of conveyor belts 5. In each free roller section 8, the plurality of rollers 80 are aligned both in the width direction W and the conveying direction D. The pair of free roller sections 8 is configured to be movable in the vertical direction relative to the pair of conveyor belts 5, between a lower position below the pair of conveyor belts 5 and an upper position above the pair of conveyor belts 5.

Figure 7:
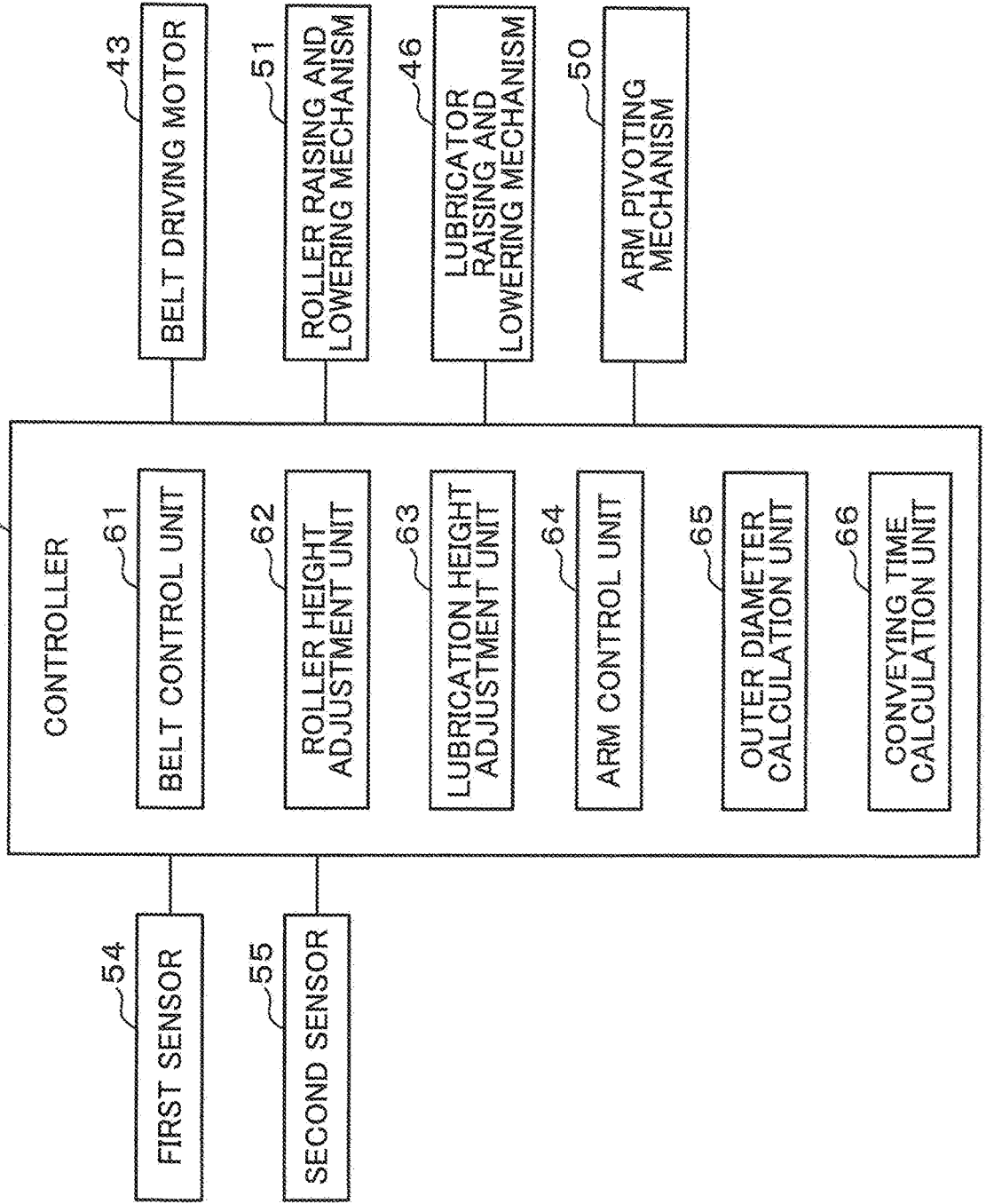
FIG. 7 is a block diagram showing a functional configuration of the tire testing machine according to the embodiment.

FIG. 7 is a block diagram showing a functional configuration of the tire testing machine 1 according to the present embodiment. The tire testing machine 1 includes a controller 60. The controller 60 includes a CPU, a ROM for storing various control programs, and a RAM for use as a working area of the CPU, for example. The controller 60 functionally includes a belt control unit 61, a roller height adjustment unit 62, a lubrication height adjustment unit 63, an arm control unit 64, an outer diameter calculation unit 65, and a conveying time calculation unit 66.

The belt control unit 61 functions to control the operation of the pair of conveyor belts 5. The roller height adjustment unit 62 functions to adjust the height of the pair of free roller sections 8. The lubrication height adjustment unit 63 functions to adjust the height of the lubricator 7. The arm control unit 64 functions to control the operation of the pair of adjusting arms 6. The outer diameter calculation unit 65 functions to calculate the outer diameter of the tire being conveyed in the conveying direction D by the conveyor belts 5. The conveying time calculation unit 66 functions to calculate the time required to convey the tire over a predetermined distance in the conveyance path.

As shown in FIG. 6, the conveyor belt 5 includes a pair of pulleys 41 disposed at upstream and downstream ends of the lubricating unit 2, and a belt 42 trained around the pulleys 41 in the form of a loop (endlessly). The belt 42 is made of rubber, for example. A belt driving motor 43 is attached to one of the pulleys 41 (in the drawing example, the pulley 41 disposed at the upstream end) (see FIG. 4).

The motor 43 operates according to a command from the belt control unit 61. The motor 43 rotates to rotate the pulleys 41, so that the belt 42 trained around the pulleys 41 moves in the conveying direction D or the opposite direction. The belt control unit 61 controls the motor 43 to switch its rotation from one direction to the other, to thereby change the moving direction of the belt 42. In this manner, the tire placed on the belt 42 is conveyed in the conveying direction D (advancing direction) or in the direction (receding direction) opposite to the conveying direction D.

As shown in FIGS. 5 and 6, the lubricator 7 is configured to, when not applying the lubricant to the tire, be located at a retracted position below the upper surfaces (conveying surfaces) of the conveyor belts 5 so as not to obstruct the conveyance of the tire. On the other hand, in order to apply the lubricant to the tire, the lubricator 7 is raised from the retracted position to a raised position at which at least part of the lubricator 7 is at the same height as the tire.

The lubricator 7 includes a brush portion 44, a support portion 45, and a lubricator raising and lowering mechanism 46. The brush portion 44, which has been impregnated with the lubricant, is pressed against the inner circumferential surface of the tire. The brush portion 44 is configured to apply the lubricant to the inner circumferential surface of the tire while rotating about an axis extending in the vertical direction. The support portion 45 rotatably supports the brush portion 44. The lubricator raising and lowering mechanism 46 is configured to raise and lower the support portion 45 in the vertical direction. The operation of the lubricator raising and lowering mechanism 46 is controlled by the lubrication height adjustment unit 63 of the controller 60.

In the present embodiment, the brush portion 44 is attached to the support portion 45 such that a brushing surface of the brush portion 44 faces downstream in the conveying direction D. The lubricator raising and lowering mechanism 46 includes an electric actuator for enabling raising and lowering of the support portion 45. The lubricator raising and lowering mechanism 46 is configured to raise the support portion 45 to a height that allows the brushing surface of the brush portion 44 to come into contact with the inner circumferential surface of the tire. When the brushing surface of the brush portion 44 is pressed against the inner circumferential surface of the tire, an unshown brush control unit of the controller 60 issues a command to rotate a drive mechanism (not shown in the drawings) for driving the brush portion 44. This allows application of the lubricant to the inner circumferential surface (bead) of the tire.

When the application of the lubricant is completed, the brush control unit controls the drive mechanism for the brush portion 44 to stop the rotation, and the lubrication height adjustment unit 63 controls the lubricator raising and lowering mechanism 46 to lower the support portion 45. This allows the brush portion 44 supported on the support portion 45 to move to the retracted position below the conveying surfaces of the conveyor belts 5, thus preventing the lubricator 7 from obstructing the conveyance of the tire in the horizontal direction.

As shown in FIG. 4, the pair of adjusting arms 6 presses an outer periphery (tread surface) of the tire to hold the tire in cooperation with the lubricator 7. The tire is held between the pair of adjusting arms 6 and the brush portion 44, thereby being positioned.

Specifically, the paired adjusting arms 6 are disposed at the outer sides of the paired conveyor belts 5, respectively, in the width direction W (left and right direction). Each adjusting arm 6 includes an arm portion 47 in the form of a rod, and a rotary roller 48 disposed at a distal end of the arm portion 47. The arm portion 47 is disposed to extend in a horizontal direction, and has a downstream end (the distal end) in the conveying direction D to which the rotary roller 48 is rotatably attached. In addition, the arm portion 47 has an upstream end (proximal end) in the conveying direction D pivotably attached to a support member about an axis extending in the vertical direction. Consequently, the arm portion 47 is pivotable about the proximal end.

A left one of the pair of adjusting arms 6 pivots about the proximal end clockwise in plan view to press and hold the left side of the tire, and a right one of the pair of adjusting arms 6 pivots about the proximal end counterclockwise in plan view to press and hold the right side of the tire. In order to realize such operation of the pair of adjusting arms 6, an interlocking link 49 is disposed between the left and right adjusting arms 6, which allows the left adjusting arm 6 to pivot in conjunction with pivotal movement of the right adjusting arm 6.

The interlocking link 49 extends across the pair of adjusting arms 6, thereby connecting the pair of adjusting arms 6 so that the pair of adjusting arms 6 pivot in conjunction with each other. When the left adjusting arm 6 pivots in a direction to press the tire, the right adjusting arm 6 also pivots in a direction to press the tire. When the left adjusting arm 6 pivots in a direction away from the tire, the right adjusting arm 6 also pivots in a direction away from the tire.

An arm pivoting mechanism 50 for pivoting the left adjusting arm 6 is attached to the proximal end (upstream end in the conveying direction D) of the left adjusting arm 6 of the pair of adjusting arms 6. When the left adjusting arm 6 is pivoted in the direction to press the tire by the arm pivoting mechanism 50, the right adjusting arm 6 is also caused to pivot in the direction to press the tire by the interlocking link 49. This makes it possible to laterally hold the tire therebetween.

The rotary roller 48 of each adjusting arm 6 is rotatably supported on the arm portion 47 about an axis extending in the vertical direction, and is configured to come into contact with the tread surface of the tire to thereby rotate the tire. When the rotary rotor 48 rotates with the tire being held by the adjusting arms 6, the tire rotates about an axis extending in the vertical direction.

As shown in FIGS. 5 and 6, the pair of free roller sections 8 movably supports the tire in the horizontal direction with the rotational axis of the tire extending in the vertical direction (the tire being in the laid position), and also rotatably supports the tire. Specifically, each free roller section 8 includes a body portion in the form of a flat plate, and a plurality of cylindrical rotary members (rollers 80) mounted on the body portion. The plurality of rotary members (plurality of rollers 80) are configured to be rotatable about an axis extending in a horizontal direction. The plurality of rollers 80 are disposed at the same height, which allows the tire to move in the horizontal direction while being stably supported by the free roller sections 8. The paired free roller sections 8 are disposed at the outer sides of the paired conveyor belts 5, respectively, in the width direction W (left and right direction).

A roller raising and lowering mechanism 51 is disposed below the pair of free roller sections 8, the roller raising and lowering mechanism 51 being configured to raise and lower the free roller sections 8. The roller raising and lowering mechanism 51 is configured to move the pair of free roller sections 8 in the vertical direction. The operation of the roller raising and lowering mechanism 51 is controlled by the roller height adjustment unit 62 of the controller 60.

The roller raising and lowering mechanism 51 includes a raising and lowering link 52 and a raising and lowering drive portion 53. The raising and lowering link 52 is disposed below the free roller sections 8 and is configured to be pivotable about an axis extending in the left and right direction. The raising and lowering drive portion 53 is provided to pivot the raising and lowering link 52. The raising and lowering link 52 is disposed to connect respective lower portions of the free roller sections 8 to a floor surface, and is pivotable to thereby change the distance between the lower portions of the free roller sections 8 and the floor surface. The raising and lowering drive portion 53 is an actuator extendable and retractable in the vertical direction, being operable to move one end of the raising and lowering link 52 in the vertical direction to thereby allow the pivotal movement of the raising and lowering link 52.

Each of the belt driving motor 43 for the conveyor belt 5, the lubricator raising and lowering mechanism 46 for the lubricator 7, the drive mechanism for the brush portion 44, the arm pivoting mechanism 50 for the adjusting arm 6, and the roller raising and lowering mechanism 51 for the free roller sections 8 operates upon receiving a signal from the controller 60.

Now, a case will be described where the lubricant is applied to a large-diameter tire in the lubricating unit 2 of the tire testing machine 1. First, for the purpose of comparison with the tire testing machine 1 according to the present embodiment, a tire carry-in operation and a lubricating operation in a lubricating unit of a reference example will be described.

Figure 15:
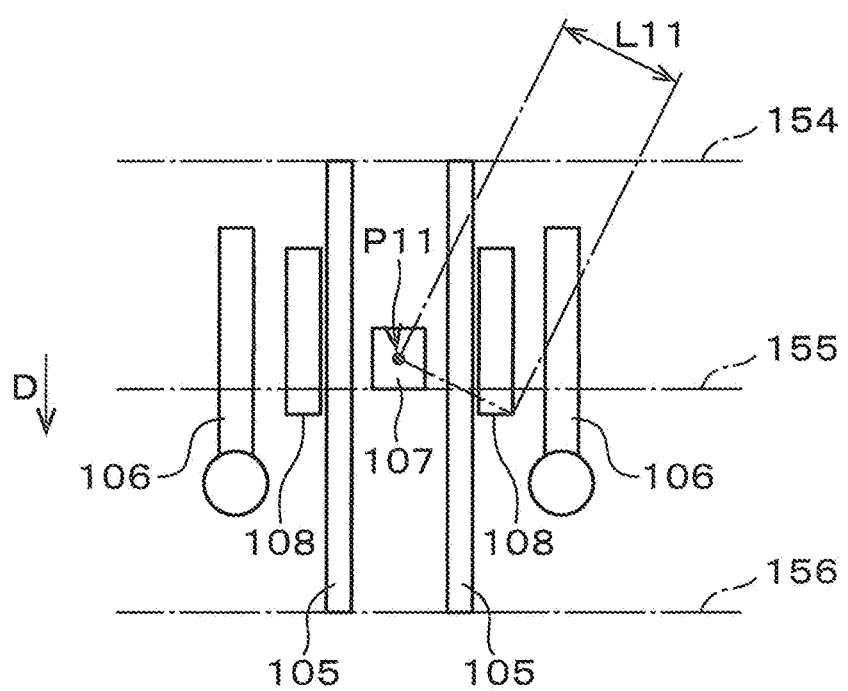
FIG. 15 is a schematic plan view showing a lubrication step in a tire testing machine according to a reference example.

As shown in FIG. 15, the lubricating unit of the reference example includes a lubricator 107 disposed between a pair of conveyor belts 105. The lubricator 107 is disposed in an intermediate part of the conveyor belts 105 in a conveying direction D. In addition, a pair of free roller sections 108 are disposed at the outer sides of the pair of conveyor belts 105. Each free roller section 108 is approximately half the length of the conveyor belt 105. The lubricator 7 is disposed at approximately half the length of the free roller sections 108 in the conveying direction D. At outer sides of the pair of free roller sections 108, a pair of adjusting arms 106 are disposed.

Each of the pair of free roller sections 108 include a plurality of rollers having an endmost roller disposed downstream of the lubricator 107 in the conveying direction D and farthest from a reference position P11 set in advance in the lubricator 107, the endmost roller being disposed such that a horizontal distance L11 between the endmost roller and the reference position P11 is smaller than a distance L1 in the tire testing machine 1 according to the present embodiment described later.

In the tire testing machine according to the reference example, the lubricating unit includes three sensors (a first sensor 154, a second sensor 155, and a third sensor 156). The first sensor 154 is operable to detect a tire at a position upstream of the lubricator 107 in the conveying direction D, the second sensor 155 is operable to detect the tire at a position near the lubricator 107, and the third sensor 156 is operable to detect the tire at a position downstream of the lubricator 107 in the conveying direction D. Upon detection of the tire, each sensor inputs to a controller a detection signal ("ON" signal) indicating the detection of the tire.

Figure 16:
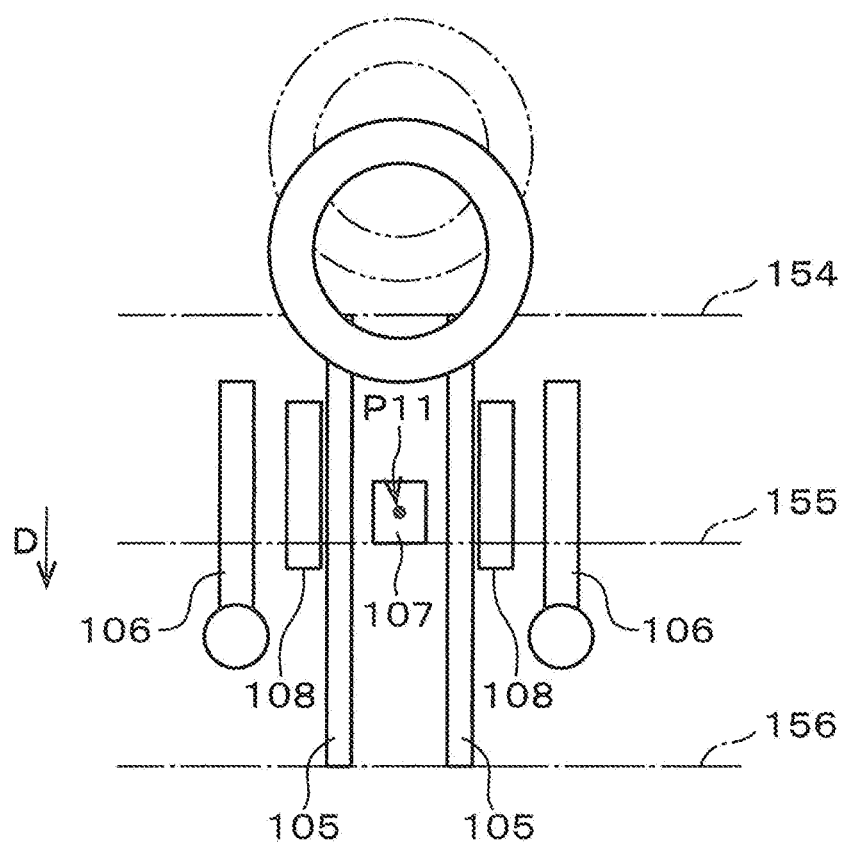
FIG. 16 is a schematic plan view showing the lubrication step in the tire testing machine according to the reference example.
Figure 17:
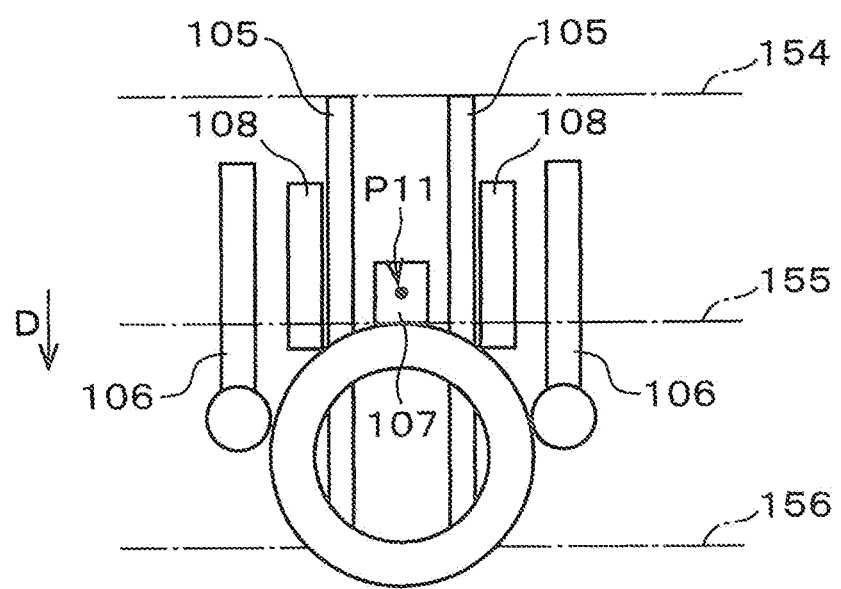
FIG. 17 is a schematic plan view showing the lubrication step in the tire testing machine according to the reference example.
Figure 18:
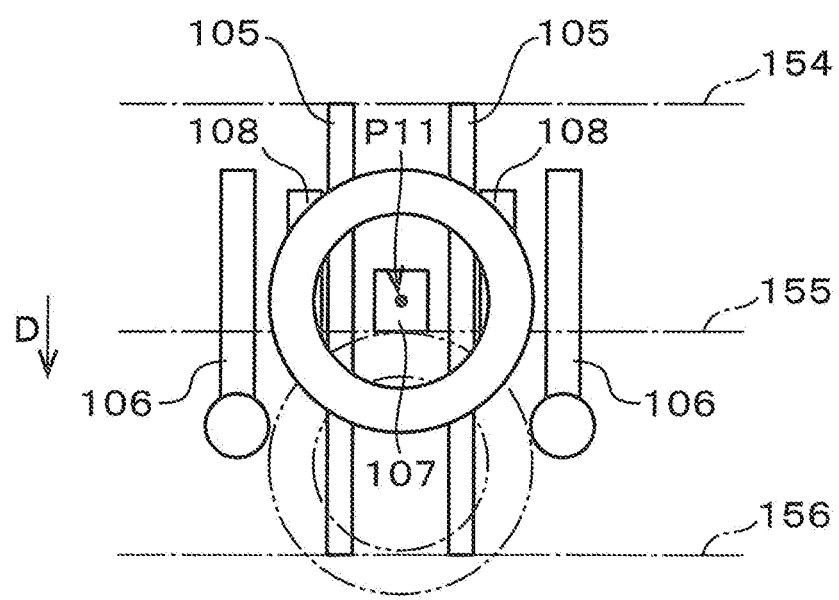
FIG. 18 is a schematic plan view showing the lubrication step in the tire testing machine according to the reference example.

As shown in FIG. 16, in the lubricating unit of the reference example, when a tire having passed through the previous steps is carried into the lubricating unit and reaches the detection position of the first sensor 154, the first sensor 154 inputs to the controller the detection signal ("ON" signal) indicating the detection of the tire. Upon receiving this signal, the controller transmits a signal for driving pulleys. When the pulleys are driven by the signal from the controller, the conveyor belts 105 move in the conveying direction D, so that the tire placed on the conveyor belts 105 are conveyed in the conveying direction D. The tire is conveyed downstream in the conveying direction D by the movement of the conveyor belts 105, and when the tire reaches the vicinity of the lubricator 107, the second sensor 155 inputs to the controller the detection signal ("ON" signal) indicating the detection of the tire.

When the tire reaches downstream ends of the conveyor belts 105, the third sensor 156 inputs to the controller the detection signal ("ON" signal) indicating the detection of the tire. Upon the detection of the tire by the third sensor 156, the controller controls an unillustrated drive mechanism to reverse the rotational direction of the conveyor belts 105.

The controller calculates the size of the tire based on the tire detection results (such as detection times) obtained by the first sensor 154, the second sensor 155, and the third sensor 156, the conveying speed of the conveyor belts 105, and the distance between the sensors, for example. Based on the calculated size of the tire, the controller moves the conveyor belts 105 in the direction opposite to the conveying direction D so that the tire moves back to a position at which the center of the tire reaches the reference position P11 of the lubricator 107.

In this manner, the tire moves back to the position at which the center of the tire reaches the reference position P11 of the lubricator 107. However, in the reference example, the following problem occurs when the tire to be tested by the tire testing machine is not of a standard size and has a larger diameter than the standard sized tires.

When the free roller sections 108 are raised with the center of the large-diameter tire positioned at the reference position P11 of the lubricator 107, the large-diameter tire may not be stably supported by the free roller sections 108 and slip off the free roller sections 108. This is because the horizontal distance L11 between the endmost roller of the free roller section 108 and the reference position P11 is smaller than the radius of the large-diameter tire, i.e. the entire circumferential portion of the large-diameter tire projects radially outward of the free roller sections 108.

Figure 19:
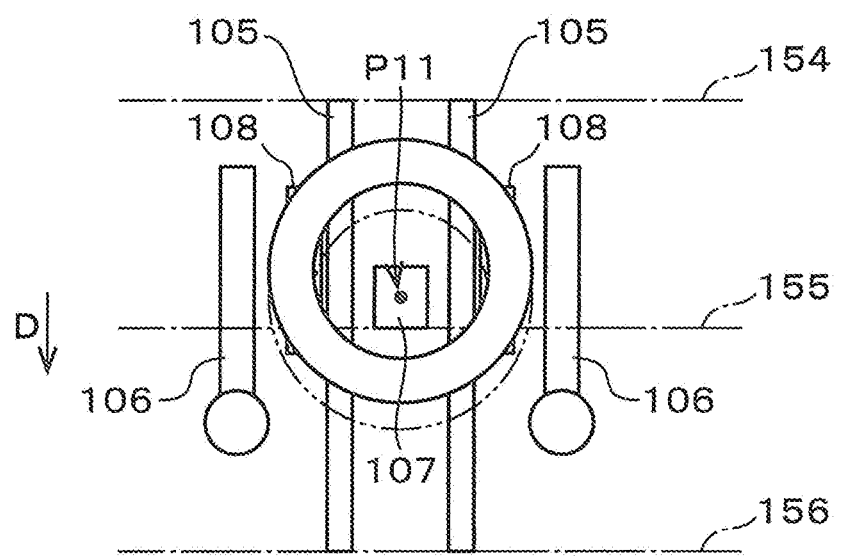
FIG. 19 is a schematic plan view showing the lubrication step in the tire testing machine according to the reference example.
Figure 20:
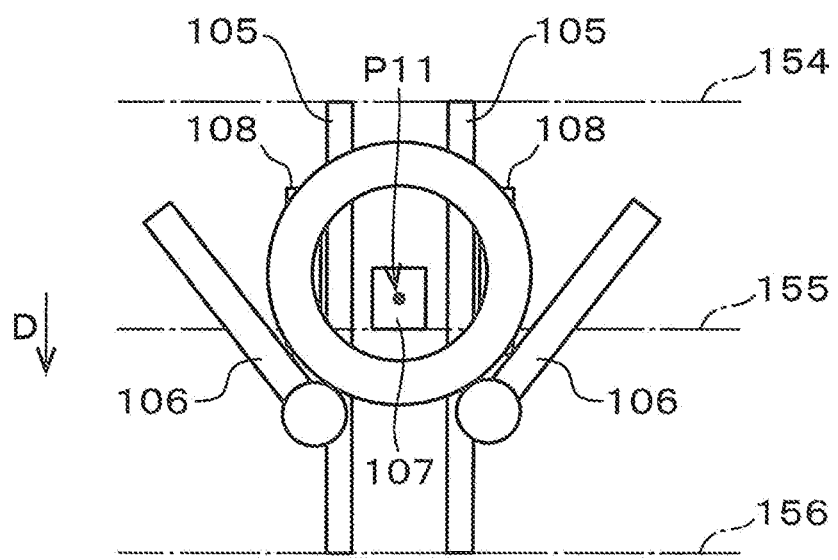
FIG. 20 is a schematic plan view showing the lubrication step in the tire testing machine according to the reference example.

Therefore, in the reference example, in order to allow the free roller sections 108 to stably support the tire, the tire has to be moved back by the conveyor belts 105 to a position upstream of the position at which the center of the large-diameter tire coincides with the reference position P11 of the lubricator 107 in the conveying direction D, as shown in FIG. 19.

When the tire is moved back to the position that prevents the tire from slipping off the free roller sections 108 at the time of raising of the free roller sections 108 as shown in FIG. 19, the controller raises a brush portion of the lubricator 107 located below the conveyor belts 105 to the same height as the inner circumferential surface of the tire.

Subsequently, the controller controls the adjusting arms 106 to pivot to thereby horizontally move the tire upstream in the conveying direction D on the free roller sections 108. This makes it possible to bring the brush portion of the lubricator 107 into contact with the inner circumferential surface of the tire. Thereafter, the controller causes the brush portion of the lubricator 107 to rotate to apply a lubricant to the inner circumferential surface of the tire.

It should be noted here that when the operation of moving the large-diameter tire backwards is performed by rotating the conveyor belts 105 in the direction opposite to the conveying direction D as described above, the above-mentioned slipping of the tire can be prevented to some extent. However, the operation of moving the tire backwards after advancing it to the position of the third sensor 156 extends the conveying distance of the tire and hence the cycle time of the tire testing operation. In addition, in the testing of a large-diameter tire, the cycle time tends to be long because the conveying speed is low. For these reasons, the cycle time of the tire testing operation is very long in the case of large-diameter tires.

Further, since a large-diameter tire is heavy, the operation of moving it backwards places a substantial load on the conveyor belts 105, which may accelerate wearing of the conveyor belts 105.

On the other hand, in the tire testing machine 1 according to the present embodiment, even in the case of testing a large-diameter tire, the free roller sections 8 can stably support the tire when the free roller sections 8 are located relatively above the conveyor belts 5, specifically as follows.

In the tire testing machine 1 according to the present embodiment, as shown in FIG. 5, each of the free roller sections 8 is configured such that the plurality of rollers 80 include an endmost roller 80A disposed downstream of the lubricator 7 in the conveying direction D and farthest from a reference position P1 set in advance in the lubricator 7, the endmost roller 80A being disposed such that the horizontal distance L1 between the endmost roller 80A and the reference position P1 is equal to or greater than a radius R of the largest tire T1 of a plurality of tires set in advance as objects of application of the lubricant.

In addition, as shown in FIG. 5, each of the pair of free roller sections 8 is preferably configured such that a distance L2 in the conveying direction D between a roller 80 farthest from the reference position P1 in the conveying direction D and the reference position P1 is equal to or greater than the radius R of the largest tire T1. This allows the free roller sections 8 to further stably support the largest tire T1.

Here, in the present embodiment, the reference position P1 is a position serving as a reference for a position of the center C of the tire when the free roller sections 8 moves relative to the conveyor belts 5 from the lower position to the upper position, and the reference position P1 is within an area of the lubricator 7 in plan view.

In the tire testing machine 1 according to the present embodiment, the radius R of the largest tire T1 of the plurality of tires set in advance as objects of application of the lubricant is, for example, in the range of 450 to 510 mm. When the radius R of the largest tire T1 is within the above-mentioned range, the distance L2 in the conveying direction D between the roller 80 farthest from the reference position P1 in the conveying direction D and the reference position P1 is preferably set within the range of about 410 to 440 mm.

Specifically, examples of tires to be applied with the lubricant in the tire testing machine 1 according to the present embodiment include PC tires for passenger cars, ULT tires for ultra light trucks, and LT tires for light trucks. In the tire testing machine 1 according to the present embodiment, the largest tire T1 of the plurality of tires set in advance as objects of application of the lubricant has an outer diameter of 1,020 mm (a radius of 510 mm), and the smallest tire of the plurality of tires has an outer diameter of 480 mm (a radius of 240 mm). The smallest tire is the smallest one of the PC tires for passenger cars in the above-mentioned tire categories.

The tire testing machine 1 including the free roller sections 8 of the above-described size allows the free roller sections 8 to stably support any selected one of the plurality of tires set in advance as objects of application of the lubricant, when the free roller sections 8 are located at the upper position relatively above the conveyor belts 5.

Further, in the tire testing machine 1 according to the present embodiment, the adjusting arms 6 have a larger diameter and hence a higher rigidity than conventional ones. This strengthens the pushing force of the adjusting arms 6. Therefore, even in the case of testing a heavy large-diameter tire, the adjusting arms 6 can move the tire placed on the free roller sections 8.

In the tire testing machine 1 according to the present embodiment, a tire carry-in operation and a lubricating operation are performed as follows. It is to be noted that in FIGS. 8 and 10 to 14, the position indicated by the dash-dot line 54 is a position (hereinafter referred to as "first position") in the conveying direction D at which a first sensor 54 detects the tire T1. In addition, the position indicated by the dash-dot line 55 is a position (hereinafter referred to as "second position") in the conveying direction D at which a second sensor 55 detects the tire T1. The first position is upstream of the reference position P1 in the conveying direction D, and the second position is downstream of the reference position P1 in the conveying direction D.

Figure 9:
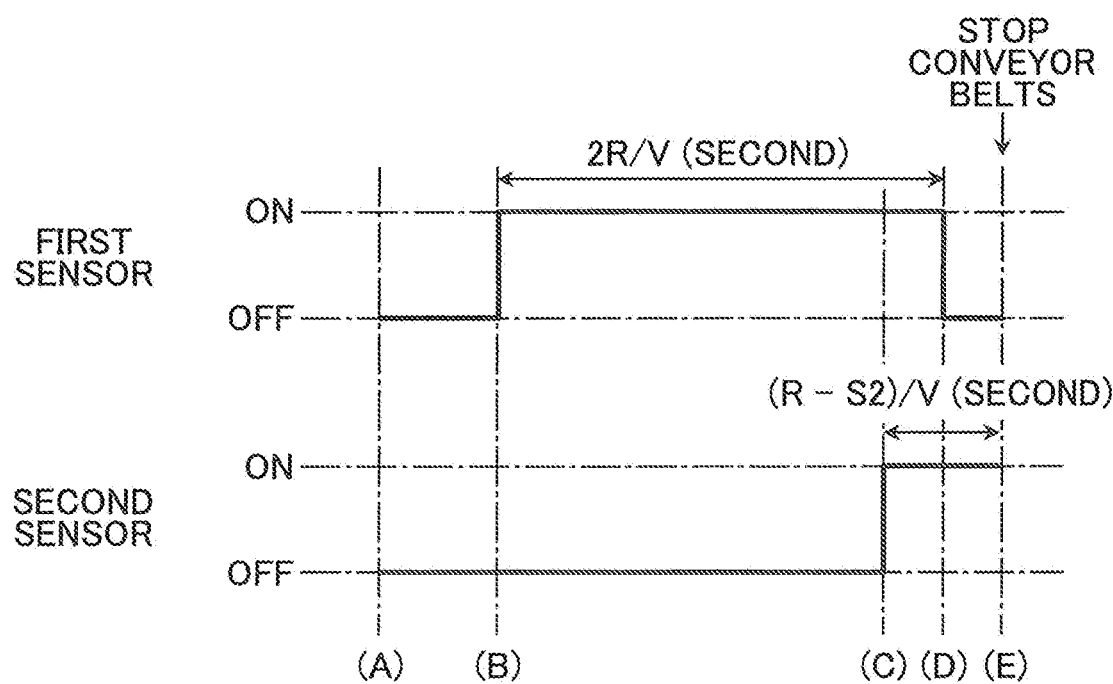
FIG. 9 is a timing chart for explaining the lubrication step in the tire testing machine according to the embodiment.
Figure 10:
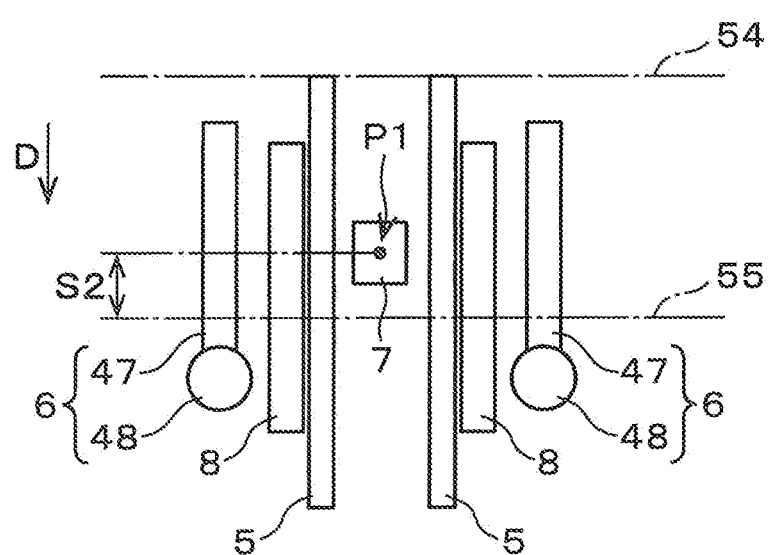
FIG. 10 is a schematic plan view showing the lubrication step in the tire testing machine according to the embodiment.
Figure 11:
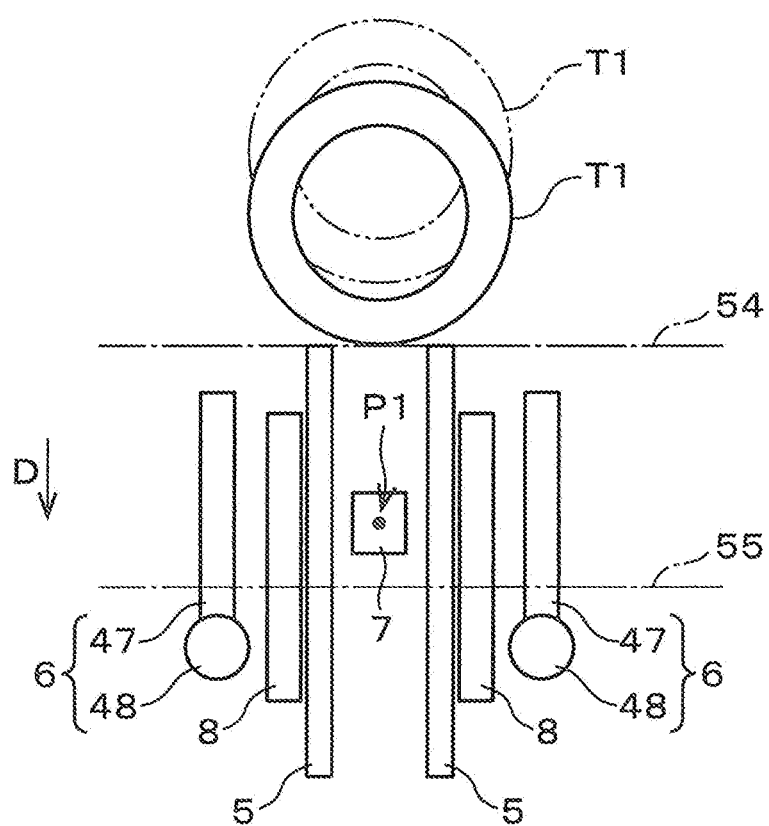
FIG. 11 is a schematic plan view showing the lubrication step in the tire testing machine according to the embodiment.

FIG. 10 shows the lubricating unit 2 before the tire T1 is carried onto the conveyor belts 5. When the tire T1 is carried onto the conveyor belts 5 as shown in FIG. 11, a front end (a downstream end in the conveying direction D) of the tire T1 reaches the first position 54 as indicated in solid line in FIG. 11 (the state (B) in FIGS. 8 and 9), allowing the first sensor 54 to detect the tire and input to the controller 60 a detection signal ("ON" signal) indicating the detection of the tire T1. Upon receiving this signal, the controller 60 transmits a signal for driving the pulleys 41. When the pulleys 41 are driven by the signal from the controller 60, the tire T1 is moved in the conveying direction D by the conveyor belts 5.

Figure 8:
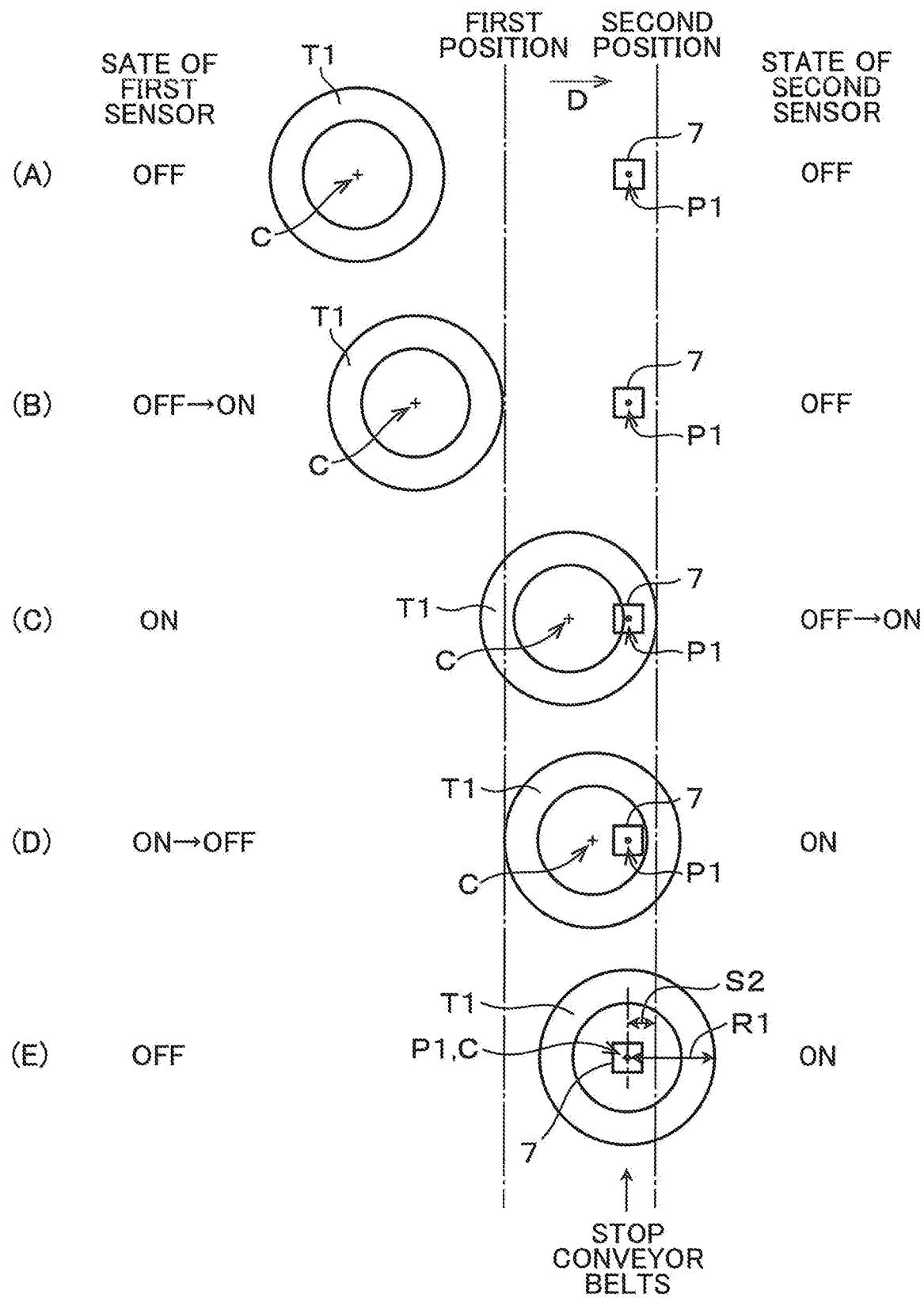
FIG. 8 is a schematic view for explaining a lubrication step of applying a lubricant to a tire in the tire testing machine according to the embodiment.
Figure 12:
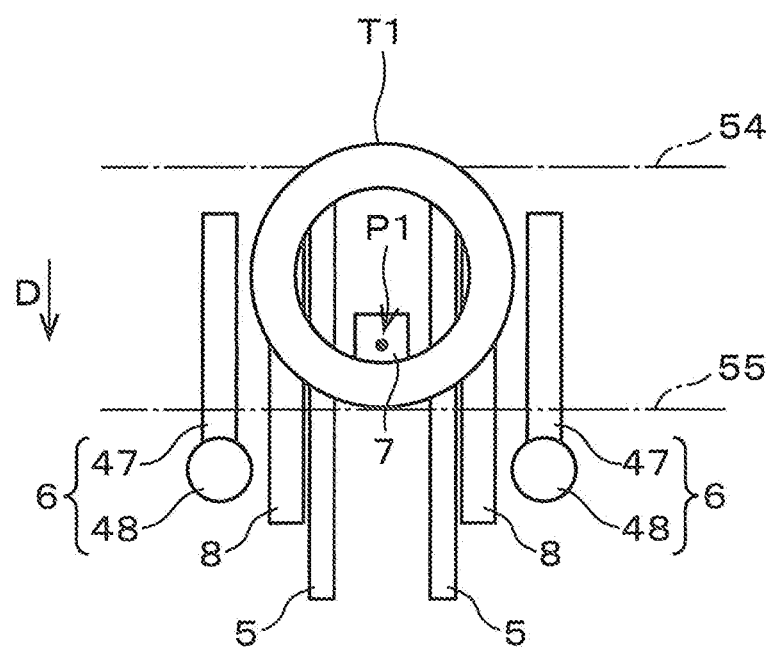
FIG. 12 is a schematic plan view showing the lubrication step in the tire testing machine according to the embodiment.

When the tire T1 is further conveyed in the conveying direction D by the conveyor belts 5 and the front end of the tire T1 reaches the second position 55 as shown in FIG. 12 (the state (C) in FIGS. 8 and 9), the second sensor 55 detects the tire T1 and inputs to the controller 60 a detection signal ("ON" signal) indicating the detection of the tire T1.

When the tire T1 is further conveyed in the conveying direction D by the conveyor belts 5 and a rear end (an upstream end in the conveying direction D) of the tire T1 reaches the first position 54 (the state (D) in FIGS. 8 and 9), the first sensor 54 inputs to the controller 60 a signal ("OFF" signal) indicating non-detection of the tire T1. In other words, when the rear end of the T1 passes through the first position 54, the signal inputted to the controller 60 by the first sensor 54 changes from the "ON" signal to the "OFF" signal.

The outer diameter calculation unit 65 calculates the outer diameter (2R) of the tire T1 being conveyed in the conveying direction D by the conveyor belts 5, based on the above-mentioned detection results of the first sensor 54 and a conveying speed V of the conveyor belts 5 controlled by the belt control unit 61. Specifically, the outer diameter calculation unit 65 calculates the outer diameter (2R) of the tire T1 using the following formula (1) based on the time (t1) from when the front end of the tire T1 reaches the first position 54 (the state (B) in FIGS. 8 and 9) to when the rear end of the tire T1 reaches the first position 54 (the state (D) in FIGS. 8 and 9) and the conveying speed (V) of the conveyor belts 5:

$$t1 = 2R/V \text{(second)} \quad (1)$$

In addition, the conveying time calculation unit 66 is configured to calculate the conveying time (t2) using the following formula (2) based on the outer diameter (2R), the conveying speed (V), and a two-point distance (S2), where the two-point distance S2 represents the distance in the conveying direction D between the reference position P1 of the lubricator 7 and the second position (see FIGS. 8 and 10):

$$t2 = (R-S2)/V \text{(second)} \quad (2)$$

Figure 13:
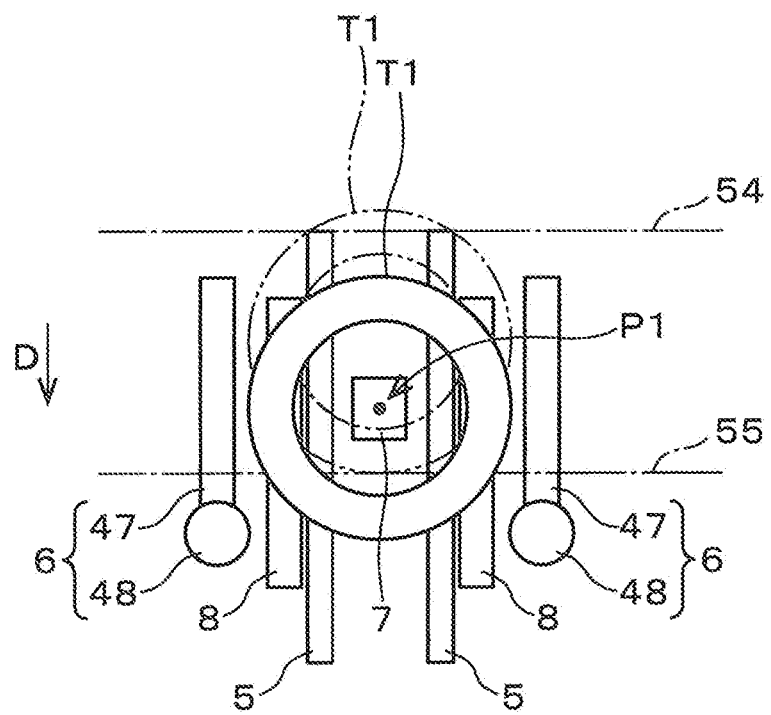
FIG. 13 is a schematic plan view showing the lubrication step in the tire testing machine according to the embodiment.

The belt control unit 61 controls the operation of the conveyor belts 5 to stop the conveyor belts 5 when the conveying time (t2) elapses from a detection point (the state (C) in FIGS. 8 and 9) when the front end of the tire T1 is detected by the second sensor 55. This makes it possible to accurately position the center C of the tire T1 at the reference position P1 of the lubricator 7, as shown in FIG. 13 (the state (E) in FIGS. 8 and 9).

The tire testing machine 1 according to the present embodiment does not include a sensor corresponding to the third sensor 156 included in the tire testing machine according to the reference example as described above, and is capable of positioning the center C of the tire T1 at the reference position P1 of the lubricator 7 without moving the tire T1 backwards in the direction opposite to the conveying direction D.

Further, in the tire testing machine 1 according to the present embodiment, the two-point distance S2 is smaller than the radius of the smallest one of the plurality of tires. This eliminates, regardless of which one is selected from the plurality of tires set in advance as objects of application of the lubricant, the need of the operation (backward operation) of returning the tire upstream in the conveying direction D from the detection point when the front end of the tire is detected by the second sensor 55.

In the tire testing machine 1 according to the present embodiment, the lubrication height adjustment unit 63 is configured to adjust the height of the lubricator 7 to a height position where the brush portion 44 of the lubricator is located radially inward of a bead of the tire T1 and faces the bead in a radial direction, when the center C of the tire is at the reference position P1. The reference position P1 is set at a position that prevents the brush portion 44 of the lubricator 7, when the height of the lubricator 7 is adjusted to the height position by the lubrication height adjustment unit 63, from coming into contact with a bead of the smallest tire.

Therefore, even when the smallest one of the plurality of tires is to be tested, there is no need to perform the operation of shifting the position of the tire T1 in the conveying direction D for the operation of adjusting the height of the lubricator 7. This makes it possible to further prevent the extension of the cycle time of the tire testing operation.

Figure 14:
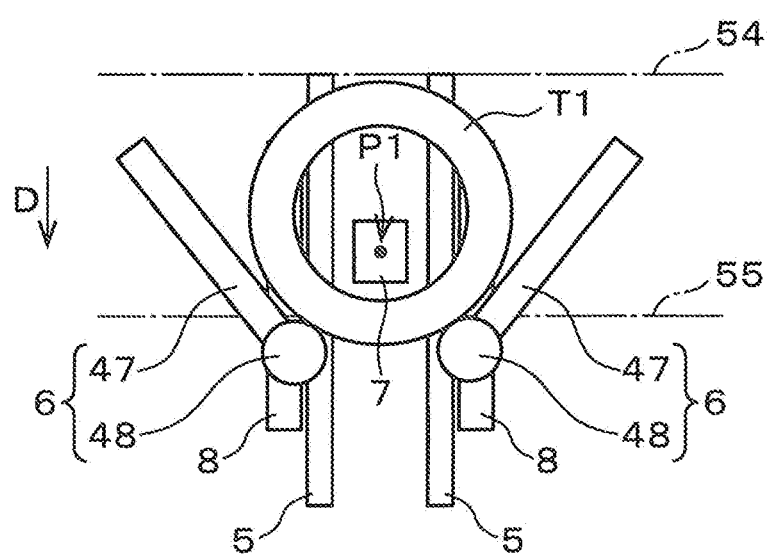
FIG. 14 is a schematic plan view showing the lubrication step in the tire testing machine according to the embodiment.

The lubrication height adjustment unit 63 controls the lubricator raising and lowering mechanism 46 to raise the brush portion 44 of the lubricator 7, and the arm control unit 64 controls the arm pivoting mechanism 50 to allow the adjusting arms 6 to hold the left and right sides of the tire T1 therebetween. Consequently, the tire T1 having moved horizontally by the holding operation of the adjusting arms 6 as shown in FIG. 14, comes into contact with the brush portion 44 of the lubricator 7 and is held on the free roller sections 8. Thereafter, the tire T1 is rotated to allow application of the lubricant to the bead of the tire T1.

It should be noted that, in the present embodiment, the raising of the brush portion 44 and the pivotal movement of the adjusting arms 6 are performed after the raising of the free roller sections 8; however, these operations may be performed concurrently. Specifically, the raising of the free roller sections 8 and the raising of the lubricator 7 may be performed concurrently, or the raising of the free roller sections 8, the raising of the lubricator 7, and the pivotal movement of the adjusting arms 6 may be performed concurrently.

The tire testing machine 1 according to the present embodiment makes it possible to stably transfer a tire between the conveyor belts 5 (conveyors) and the free roller sections 8, thus enabling testing of tires of various sizes, from small-diameter tires to large-diameter tires, unlike the conventional tire testing machines that are only capable of testing small-diameter tires for regular passenger cars.

It should be understood that the embodiment disclosed herein is illustrative, and is not intended to limit the claimed invention in any way. Particularly, matters not specifically described in the embodiment disclosed herein, such as a running condition, an operation condition, various parameters, a component dimension, a component weight, and a component volume, are within the scope normally implemented by the person skilled in the art, and employ values which will be easily determined by the person skilled in the art.

As described above, a tire testing machine is provided which includes a free roller section, capable of allowing the free roller section to stably support any selected one of a plurality of tires set in advance as objects of application of a lubricant, when the free roller section is located relatively above a conveyor belt.

The provided tire testing machine is for testing a tire. The tire testing machine comprises: a conveyor belt, a lubricator, an adjusting arm, and a free roller section. The conveyor belt extends in a horizontal direction and configured to convey the tire in a conveying direction. The lubricator is disposed at a position corresponding to an intermediate part of the conveyor belt in the conveying direction and configured to apply a lubricant to an inner circumferential surface of the tire. The adjusting arm is configured to adjust a position of the tire in the horizontal direction relative to the lubricator. The free roller section includes a plurality of rollers arranged along the conveyor belt. The free roller section supports the tire so that the tire is movable in the horizontal direction. The free roller section is configured to be movable in a vertical direction relative to the conveyor belt, between a lower position below the conveyor belt and an upper position above the conveyor belt.

The free roller section is configured such that the plurality of rollers include an endmost roller disposed downstream of the lubricator in the conveying direction and farthest from a predetermined reference position, the endmost roller being disposed such that a horizontal distance between the endmost roller and the reference position is equal to or greater than a radius of a largest one of a plurality of tires set in advance as objects of application of the lubricant. The reference position is a position serving as a reference for a position of a center of the tire when the free roller section moves from the lower position to the upper position relative to the conveyor belt, the reference position being within an area of the lubricator in plan view.

According to this tire testing machine, the distance between the endmost roller and the reference position is equal to or greater than the radius of the largest tire. This allows, when the free roller section moves from the lower position to the upper position relative to the conveyor belt with the largest tire being disposed such that the center thereof coincides with the reference position in plan view, the free roller section to stably support the tire. Furthermore, in this tire testing machine, the reference position is within the area of the lubricator in plan view. This allows a hollow space (in which a wheel is to be disposed) defined radially inward of the tire bead to lie at a position corresponding to the lubricator. This facilitates the subsequent step of disposing a brush portion of the lubricator in the hollow space by adjusting the height of the lubricator.

Specifically, in the above-described tire testing machine, the radius of the largest tire may be in a range of 450 to 510 mm.

It is preferable that the above-described tire testing machine further comprises: a first sensor operable to detect the tire being conveyed by the conveyor belt at a first position upstream of the reference position in the conveying direction; a second sensor operable to detect the tire being conveyed by the conveyor belt at a second position downstream of the reference position in the conveying direction; a belt control unit for controlling operation of the conveyor belt; an outer diameter calculation unit for calculating an outer diameter of the tire based on a detection result of the first sensor and a conveying speed of the conveyor belt controlled by the belt control unit; and a conveying time calculation unit for calculating a conveying time required for the center of the tire to reach the reference position from a detection point when a downstream end of the tire in the conveying direction is detected by the second sensor, wherein the conveying time calculation unit is configured to calculate the conveying time based on a two-point distance, which is a distance between the reference position and the second position in the conveying direction, the outer diameter, and the conveying speed, and the belt control unit is configured to control the operation of the conveyor belt to stop the conveyor belt when the conveying time elapses from the detection point.

This configuration makes it possible to accurately position the center of the tire at the reference position, specifically as follows. The outer diameter of the tire can be calculated based on the time from when a front end of the tire (the downstream end of the tire in the conveying direction) is detected at the first position by the first sensor to when a rear end of the tire (an upstream end of the tire in the conveying direction) is detected at the first position by the first sensor, and the conveying speed of the conveyor belt. In addition, since the two-point distance is a constant distance set in advance in the tire testing machine, it is possible to calculate the conveying time, i.e. the time required for the center of the tire to reach the reference position from the detection point when the front end of the tire is detected by the second sensor, based on the outer diameter, the two-point distance, and the conveying speed. Based on this calculation result, the belt control unit controls the operation of the conveyor belt to stop the conveyor belt when the conveying time elapses from the detection point. This makes it possible to accurately position the center of the tire at the reference position.

In the above-described tire testing machine, the two-point distance is preferably smaller than a radius of a smallest one of the plurality of tires.

In this configuration, since the two-point distance is smaller than the radius of the smallest one of the plurality of tires, the center of the smallest tire is located upstream of the reference position in the conveying direction at the detection point when the front end of the tire is detected at the second position by the second sensor. Therefore, to position the center of the tire at the reference position, it is only required to convey the tire further downstream in the conveying direction. Thus, this configuration makes it possible to position the center of the tire at the reference position without performing the operation (backward operation) of returning the tire upstream in the conveying direction after the detection point when the front end of the tire is detected at the second position by the second sensor. The elimination of the backward operation makes it possible to prevent extension of the conveying distance of the tire and extension of the test time due to the backward operation. This makes it possible to prevent the extension of the cycle time of the tire testing operation. Furthermore, since this prevents increase in the load acting on the conveyor belt, the conveyor belt can be prevented from wearing.

It is preferable that the above-described tire testing machine further comprises: a belt control unit for controlling operation of the conveyor belt; and a lubrication height adjustment unit for adjusting a height of the lubricator, wherein the belt control unit is configured to control the operation of the conveyor belt to stop the conveyor belt when the center of the tire reaches the reference position in the conveying direction, the lubrication height adjustment unit is configured to adjust the height of the lubricator to a height position where a portion of the lubricator is located radially inward of a bead of the tire and faces the bead in a radial direction, when the center of the tire is at the reference position, and the reference position is set at a position that prevents the portion of the lubricator, when the height of the lubricator is adjusted to the height position by the lubrication height adjustment unit, from coming into contact with the bead of a smallest one of the plurality of tires.

In this configuration, the reference position is set at a position that prevents the portion (for example, a brush portion of the lubricator) of the lubricator, when the height of the lubricator is adjusted to the height position, from coming into contact with the bead of the tire when the tire being tested is the smallest tire. Therefore, even when the smallest one of the plurality of tires is to be tested, there is no need to perform the operation of shifting the position of the tire in the conveying direction for the operation of adjusting the height of the lubricator. This makes it possible to further prevent the extension of the cycle time of the tire testing operation.

Specifically, in the above-described tire testing machine, a radius of the smallest tire may be in a range of 205 to 250 mm (a diameter of the smallest tire may be in a range of 410 to 500 mm).

The above-described tire testing machine may be configured as follows: The reference position may coincide with the center of the tire in plan view when the tire is at a predetermined set position (for example, the position of the tire shown in (E) of FIG. 8 or the position of the tire indicated in solid line in FIG. 13); the set position may be a position of the tire when an adjustment operation, which is an operation of the adjusting arm for bringing the tire supported by the plurality of rollers to a predetermined lubrication position (for example, the position of the tire shown in FIG. 14), the set position being downstream of the lubrication position in the conveying direction; and the lubrication position may be where the tire is when the tire is being applied with the lubricant.

The invention claimed is:

1. A tire testing machine for testing a tire, comprising:
    a conveyor belt, extending in a horizontal direction, for conveying the tire in a conveying direction;
    a lubricator, disposed at a position corresponding to an intermediate part of the conveyor belt in the conveying direction, for applying a lubricant to an inner circumferential surface of the tire;
    an adjusting arm for adjusting a position of the tire in a horizontal direction relative to the lubricator; and
    a free roller section, including a plurality of rollers arranged along the conveyor belt, for supporting the tire so that the tire is movable in a horizontal direction, the free roller section being movable in a vertical direction relative to the conveyor belt, between a lower position below the conveyor belt and an upper position above the conveyor belt, wherein
    the free roller section is configured such that the plurality of rollers include an endmost roller disposed downstream of the lubricator in the conveying direction and farthest from a predetermined reference position, the endmost roller being disposed such that a horizontal distance between the endmost roller and the reference position is equal to or greater than a radius of a largest one of a plurality of tires set in advance as objects of application of the lubricant, and
    the reference position is a position serving as a reference for a position of a center of the tire when the free roller section moves from the lower position to the upper position relative to the conveyor belt, the reference position being within an area of the lubricator in plan view.

2. The tire testing machine according to claim 1, wherein the radius of the largest tire is in a range of 450 to 510 mm.

3. The tire testing machine according to claim 1, further comprising:
    a first sensor operable to detect the tire being conveyed by the conveyor belt at a first position upstream of the reference position in the conveying direction;
    a second sensor operable to detect the tire being conveyed by the conveyor belt at a second position downstream of the reference position in the conveying direction;
    a belt control unit for controlling operation of the conveyor belt;
    an outer diameter calculation unit for calculating an outer diameter of the tire based on a detection result of the first sensor and a conveying speed of the conveyor belt controlled by the belt control unit; and
    a conveying time calculation unit for calculating a conveying time required for the center of the tire to reach the reference position from a detection point when a downstream end of the tire in the conveying direction is detected by the second sensor, wherein
    the conveying time calculation unit is configured to calculate the conveying time based on a two-point distance, which is a distance between the reference position and the second position in the conveying direction, the outer diameter, and the conveying speed, and
    the belt control unit is configured to control the operation of the conveyor belt to stop the conveyor belt when the conveying time elapses from the detection point.

4. The tire testing machine according to claim 3, wherein the two-point distance is smaller than a radius of a smallest one of the plurality of tires.

5. The tire testing machine according to claim 1, further comprising:
    a belt control unit for controlling operation of the conveyor belt; and
    a lubrication height adjustment unit for adjusting a height of the lubricator, wherein
    the belt control unit is configured to control the operation of the conveyor belt to stop the conveyor belt when the center of the tire reaches the reference position in the conveying direction,
    the lubrication height adjustment unit is configured to adjust the height of the lubricator to a height position where a portion of the lubricator is located radially inward of a bead of the tire and faces the bead in a radial direction, when the center of the tire is at the reference position, and
    the reference position is set at a position that prevents the portion of the lubricator, when the height of the lubricator is adjusted to the height position by the lubrication height adjustment unit, from coming into contact with the bead of a smallest one of the plurality of tires.

6. The tire testing machine according to claim 5, wherein a radius of the smallest tire is in a range of 205 to 250 mm.

7. The tire testing machine according to claim 1, wherein the reference position coincides with the center of the tire in plan view when the tire is at a predetermined set position,
    the set position is a position of the tire when adjustment operation is started, the adjustment operation being operation of the adjusting arm for bringing the tire supported by the plurality of rollers to a predetermined lubrication position, the set position being downstream of the lubrication position in the conveying direction, and
    the lubrication position is a position of the tire when the tire is being applied with the lubricant.

* * * * *